US012587244B2

(12) United States Patent
Chao et al.

(10) Patent No.: US 12,587,244 B2
(45) Date of Patent: Mar. 24, 2026

(54) BEAM DIVERSITY FOR MULTICAST AND BROADCAST SYSTEMS

(71) Applicant: Nokia Technologies Oy, Espoo (FI)

(72) Inventors: Hua Chao, Shanghai (CN); Yonggang Wang, Shanghai (CN); Naizheng Zheng, Beijing (CN)

(73) Assignee: Nokia Technologies Oy, Espoo (FI)

( * ) Notice: Subject to any disclaimer, the term of this patent is extended or adjusted under 35 U.S.C. 154(b) by 403 days.

(21) Appl. No.: 18/555,458

(22) PCT Filed: May 13, 2021

(86) PCT No.: PCT/CN2021/093492
§ 371 (c)(1),
(2) Date: Oct. 13, 2023

(87) PCT Pub. No.: WO2022/236756
PCT Pub. Date: Nov. 17, 2022

(65) Prior Publication Data
US 2024/0129006 A1        Apr. 18, 2024

(51) Int. Cl.
*H04B 7/06* (2006.01)
*H04W 72/232* (2023.01)

(52) U.S. Cl.
CPC ......... *H04B 7/0617* (2013.01); *H04B 7/0626* (2013.01); *H04B 7/06952* (2023.05); *H04W 72/232* (2023.01)

(58) Field of Classification Search
CPC .. H04B 7/0617; H04B 7/0626; H04B 7/0822; H04B 17/345; H04B 7/088; H04B 7/06952; H04W 52/42; H04W 72/232; H04L 1/06; H04L 1/189; H04L 1/1893; H04L 1/1896; H04L 1/0009
See application file for complete search history.

(56) References Cited

U.S. PATENT DOCUMENTS 10,231,241 B2 * 3/2019 Kim ..................... H04B 7/0695
12,490,115 B2 * 12/2025 Chen ................. H04W 74/0808
(Continued)

FOREIGN PATENT DOCUMENTS

CN        110401922 A        11/2019
EP        3582519 A1        12/2019
(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.
(Continued)

*Primary Examiner* — Syed Ali
(74) *Attorney, Agent, or Firm* — Nokia Technologies Oy

(57)        ABSTRACT

Disclosed are example embodiments of methods, apparatuses and systems supporting beam diversity for multimedia broadcast multicast services. A method may comprise receiving information of one or more beams and abeam-specific repetition pattern for at least one of the one or more beams for transmission of a service from a network device, and receiving the service on the at least one of the one or more beams based on the beam-specific repetition pattern.

15 Claims, 10 Drawing Sheets

<u>100</u>

(56) References Cited

U.S. PATENT DOCUMENTS

| | | | |
|---|---|---|---|
| 2019/0268879 A1 | 8/2019 | Lee et al. | |
| 2020/0045737 A1* | 2/2020 | Ly | H04L 1/1816 |
| 2021/0013933 A1 | 1/2021 | Zhou et al. | |
| 2021/0037500 A1* | 2/2021 | Liu | H04L 1/189 |
| 2021/0194714 A1* | 6/2021 | Kadiri | H04W 72/30 |
| 2022/0038998 A1* | 2/2022 | Taherzadeh Boroujeni | |
| | | | H04W 48/12 |
| 2022/0078735 A1* | 3/2022 | Saggar | H04L 27/261 |
| 2022/0224578 A1* | 7/2022 | Lin | H04L 5/0044 |
| 2024/0155408 A1* | 5/2024 | Tidestav | H04B 7/0696 |
| 2024/0171239 A1* | 5/2024 | Wang | H04B 7/0617 |
| 2024/0178970 A1* | 5/2024 | Tidestav | H04L 1/1822 |

FOREIGN PATENT DOCUMENTS

| | | |
|---|---|---|
| EP | 3731576 A1 | 10/2020 |
| WO | 2018/009462 A1 | 1/2018 |
| WO | 2018/045307 A1 | 3/2018 |

OTHER PUBLICATIONS

"3rd Generation Partnership Project; Technical Specification Group Radio Access Network; NR; Physical layer procedures for data (Release 16)", 3GPP TS 38.214, V16.4.0, Dec. 2020, pp. 1-169.

"WID revision: NR Multicast and Broadcast Services", 3GPP TSG RAN Meeting #88-e, RP-201308, Agenda: 9.10.8, Huawei, Jun. 29-Jul. 3, 2020, 6 pages.

Fallgren et al., "Multicast and Broadcast Enablers for High-Performing Cellular V2X Systems", IEEE Transactions on Broadcasting, vol. 65, No. 2, Jun. 2019, pp. 454-463.

International Search Report and Written Opinion received for corresponding Patent Cooperation Treaty Application No. PCT/CN2021/093492, dated Feb. 10, 2022, 10 pages.

"Remaining issues on SS block and SS burst set composition", 3GPP TSG RAN WG1 NR Ad-Hoc#3, R1-1715606, 6 Agenda: 6.1.1, vivo, Sep. 18-21, 2017, 5 pages.

Extended European Search Report received for corresponding European Patent Application No. 21941329.1, dated Dec. 23, 2024, 10 pages.

"Discussion on Beam Sweeping Configuration for Flexible MBS Control Plane Scheduling", 3GPP TSG RAN WG2#113bis-e, R2-2103167, Agenda: 8.1.3, TCL Communication Ltd., Apr. 12-20, 2021, 5 pages.

"Considerations on MBMS reliability for RRC_CONNECTED Ues", 3GPP TSG RAN WG1 Meeting #102-e, R1-2005590, Agenda: 8.12.2, Sony, Aug. 17-28, 2020, 3 pages.

"FL summary#4 on improving reliability for MBS for RRC_CONNECTED Ues", 3GPP TSG RAN WG1 Meeting #103-e, R1-2009716, Agenda: 8.12.2, Huawei, Oct. 26-Nov. 13, 2020, 15 pages.

* cited by examiner

100

700

BEAM DIVERSITY FOR MULTICAST AND BROADCAST SYSTEMS

RELATED APPLICATION

This application was originally filed as PCT Application No. PCT/CN2021/093492 on May 13, 2021, the contents of which are incorporated herein by reference in their entirety.

TECHNICAL FIELD

Various example embodiments described herein generally relate to communication technologies, and more particularly, to methods, apparatuses and systems supporting beam diversity for multimedia broadcast multicast services.

BACKGROUND

Multimedia broadcast multicast service (MBMS), also termed as multicast and broadcast service (MBS), is a point-to-multipoint (PTM) service where data packets are transmitted simultaneously from a single source to multiple destinations. 3GPP supports two architectures for delivering MBS services, i.e. multicast broadcast single frequency network (MBSFN) and single cell-point to multipoint (SC-PTM).

SUMMARY

A brief summary of example embodiments is provided below to provide basic understanding of some aspects of various example embodiments. It should be noted that this summary is not intended to identify key features of essential elements or define scopes of the example embodiments, and its sole purpose is to introduce some concepts in a simplified form as a preamble for a more detailed description provided below.

In a first aspect, an example embodiment of a terminal device is provided. The terminal device may comprise at least one processor and at least one memory including computer program code stored thereon. The at least one memory and the computer program code may be configured to, with the at least one processor, cause the terminal device to perform actions including receiving information of one or more beams and a beam-specific repetition pattern for at least one of the one or more beams for transmission of a service from a network device, and receiving the service on the at least one of the one or more beams based on the beam-specific repetition pattern.

In a second aspect, an example embodiment of a network device is provided. The network device may comprise at least one processor and at least one memory including computer program code stored thereon. The at least one memory and the computer program code may be configured to, with the at least one processor, cause the network device to perform actions including receiving channel state information from one or more terminal devices, determining, based on the channel state information, one or more beams and a beam-specific repetition pattern for the respective one or more beams for transmission of a service to the one or more terminal devices, indicating the one or more beams and the beam-specific repetition pattern to the one or more terminal devices, and transmitting the service on the one or more beams using the beam-specific repetition pattern.

In a third aspect, an example embodiment of a method implemented at a terminal device is provided. The method may comprise receiving information of one or more beams and a beam-specific repetition pattern for at least one of the one or more beams for transmission of a service from a network device, and receiving the service on the at least one of the one or more beams based on the beam-specific repetition pattern.

In a fourth aspect, an example embodiment of a method implemented at a network device is provided. The method may comprise receiving channel state information from one or more terminal devices, determining, based on the channel state information, one or more beams and a beam-specific repetition pattern for the respective one or more beams for transmission of a service to the one or more terminal devices, indicating the one or more beams and the beam-specific repetition pattern to the one or more terminal devices, and transmitting the service on the one or more beams using the beam-specific repetition pattern.

In a fifth aspect, an example embodiment of an apparatus for receiving a service is provided. The apparatus may comprise means for receiving information of one or more beams and a beam-specific repetition pattern for at least one of the one or more beams for transmission of a service from a network device, and means for receiving the service on the at least one of the one or more beams based on the beam-specific repetition pattern.

In a sixth aspect, an example embodiment of an apparatus for providing a service is provided. The apparatus may comprise means for receiving channel state information from one or more terminal devices, means for determining, based on the channel state information, one or more beams and a beam-specific repetition pattern for the respective one or more beams for transmission of a service to the one or more terminal devices, means for indicating the one or more beams and the beam-specific repetition pattern to the one or more terminal devices, and means for transmitting the service on the one or more beams using the beam-specific repetition pattern.

In a seventh aspect, an example embodiment of a computer program is provided. The computer program may comprise instructions stored on a computer readable medium. The instructions may be executed by at least one processor of a terminal device to cause the terminal device to perform actions including receiving information of one or more beams and a beam-specific repetition pattern for at least one of the one or more beams for transmission of a service from a network device, and receiving the service on the at least one of the one or more beams based on the beam-specific repetition pattern.

In an eighth aspect, an example embodiment of a computer program is provided. The computer program may comprise instructions stored on a computer readable medium. The instructions may be executed by at least one processor of a network device to cause the network device to perform actions including receiving channel state information from one or more terminal devices, determining, based on the channel state information, one or more beams and a beam-specific repetition pattern for the respective one or more beams for transmission of a service to the one or more terminal devices, indicating the one or more beams and the beam-specific repetition pattern to the one or more terminal devices, and transmitting the service on the one or more beams using the beam-specific repetition pattern.

Other features and advantages of the example embodiments of the present disclosure will also be apparent from the following description of specific example embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

As used herein, the term "network device" refers to any suitable entities or devices that can provide cells or coverage, through which the terminal device can access the network or receive services. The network device may be commonly referred to as a base station. The term "base station" used herein may represent a node B (NodeB or NB), an evolved node B (eNodeB or eNB), or a gNB. The base station may be embodied as a macro base station, a relay node, or a low power node such as a pico base station or a femto base station. The base station may consist of several distributed network units, such as a central unit (CU), one or more distributed units (DUs), one or more remote radio heads (RRHs) or remote radio units (RRUs). The number and functions of these distributed units depend on the selected split RAN architecture.

As used herein, the term "terminal device" or "user equipment" (UE) refers to any entities or devices that can wirelessly communicate with the network devices or with each other. Examples of the terminal device can include a mobile phone, a mobile terminal (MT), a mobile station (MS), a subscriber station (SS), a portable subscriber station (PSS), an access terminal (AT), a computer, a wearable device, an on-vehicle communication device, a machine type communication (MTC) device, a D2D communication device, a V2X communication device, a sensor and the like. The term "terminal device" can be used interchangeably with a UE, a user terminal, a mobile terminal, a mobile station, or a wireless device.

Figure 1:
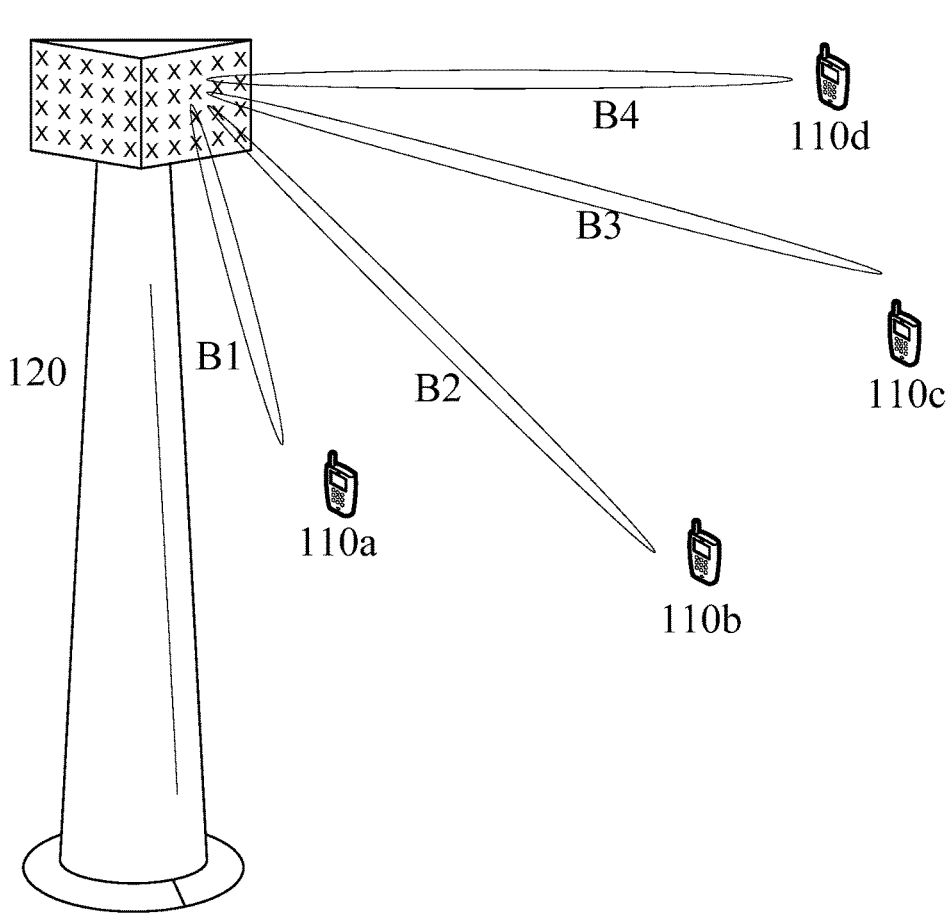
FIG. 1 is a schematic diagram illustrating an example cellular communication network.

FIG. 1 illustrates a schematic diagram of an example cellular communication network 100, such as a 5G NR network, in which aspects of the present disclosure may be performed. Referring to FIG. 1, the cellular communication network 100, which may be a part of a larger network, may include a base station 120 shown as gNB and a plurality of user equipment (UE) devices 110a, 110b, 110c, 110d (collectively referred to as UEs 110) in wireless communication with the gNB 120. As shown in FIG. 1, the gNB 120 may include one or more antenna arrays, and each antenna array may include a number of antenna elements. With the one or more antenna arrays, the gNB 120 may support multiple-input multiple-output (MIMO) technologies including for example beam-forming. For example, the gNB 120 can control amplitudes and phase shifts of transmit signals provided to the antenna elements such that the signals radiated from the antenna elements coherently combine together for a particular transmit direction and destructively cancel each other out for other directions, forming an aggregate transmit signal exhibiting beam-like qualities with more power propagating in the particular direction. In the example shown in FIG. 1, the gNB 120 serves the UEs 110a, 110b, 110c and 110d with beams B1, B2, B3 and B4, respectively. It would be appreciated that one beam may serve one or more UEs and one UE may be served by one or more beams, depending on position of the UEs. Beamforming can improve cell coverage and reduce interference between signals.

Figure 2:
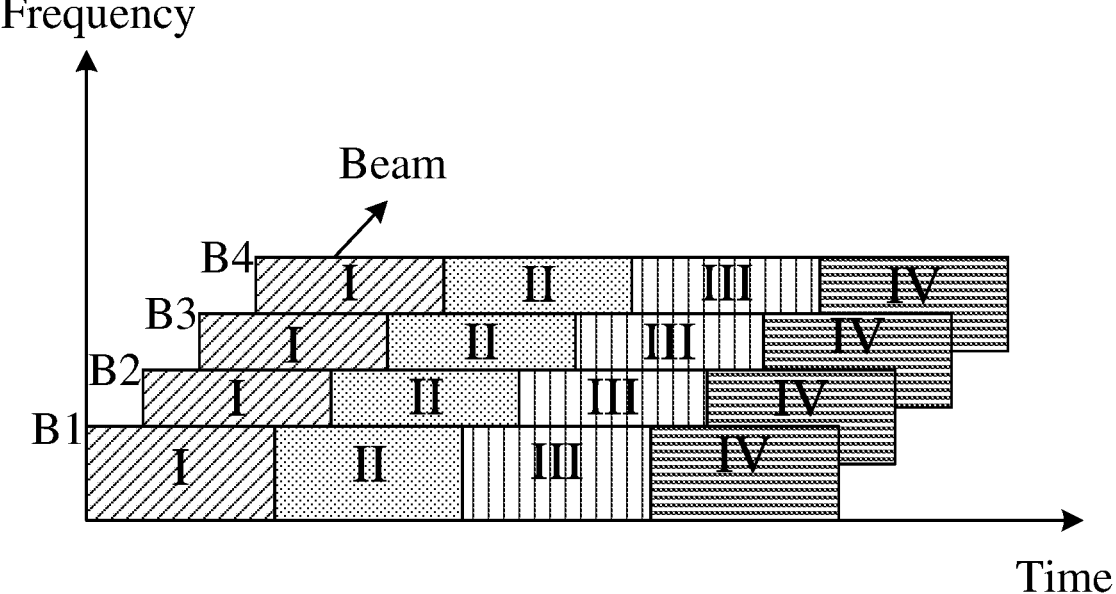
FIG. 2 is a schematic diagram illustrating a common repetition pattern for a plurality of beams.

The gNB 120 may provide multicast and broadcast services (MBSs) on the beams to the UEs 110. To meet reliability requirements for the MBS services, the gNB 120 may transmit multicast/broadcast traffic on multiple beams and each beam may include multiple repetitive transmissions of the multicast/broadcast traffic. FIG. 2 shows an example of multi-beam repetition transmissions for an MBS service. Referring to FIG. 2, the gNB 120 provides an MBS service on four beams B1, B2, B3 and B4 to a plurality of UEs, and the beams B1-B4 have a common repetition pattern including four repetitions I, II, III and IV, which means that the same traffic data would be transmitted four times on each beam. A UE which is interested in the MBS service may receive the repetitions I-IV on the one or more beams and perform signal combining on the repetitions I-IV to ensure reliable reception of the MBS service. The multi-beam repetition transmission scheme shown in FIG. 2 can improve reliability of the MBS service, but it also has some shortcomings. For example, since the gNB 120 has to select a conservative modulation and coding scheme (MCS) to ensure reliability for the UE(s) having the worst channel quality, some certain beams may include unnecessary repetitions, which results in a waste of power and low spectral efficiency. The unnecessary repetitions also increase inter-beam interference to other point-to-point (PTP) and/or point-to-multipoint (PTM) traffic.

Hereinafter, example embodiments of methods, apparatuses and systems supporting beam diversity for MBS services will be discussed. In the example embodiments, an MBS service may be transmitted on multiple beams, and the multiple beams may have a beam-specific repetition pattern. By using the beam-specific repetition pattern for the multiple beams, unnecessary repetition on the beams may be avoided. Therefore, inter-beam interference can be reduced, and spectral efficiency can be improved. In some example embodiments, the beam-specific repetitions may have flexible power allocation, which can save power consumption and further improve the spectral efficiency.

Figure 3:
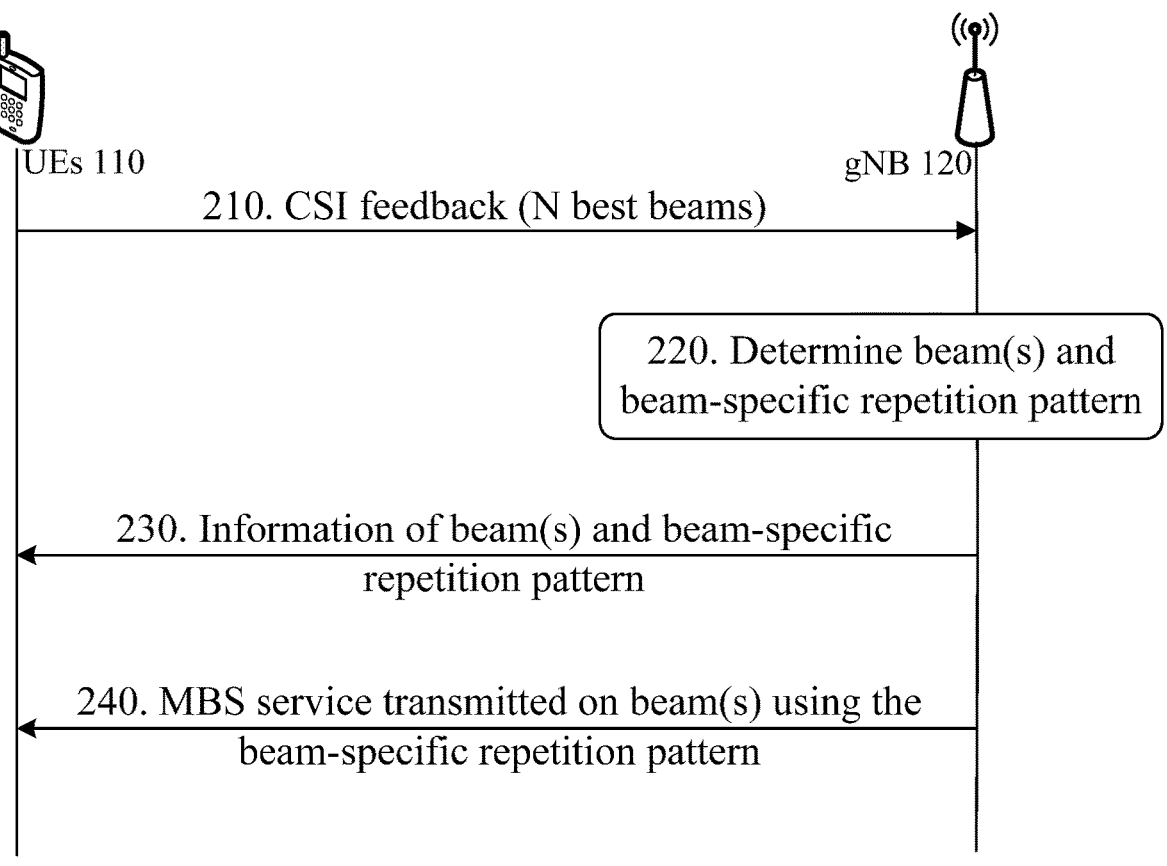
FIG. 3 is a signaling diagram illustrating example operations for providing an MBS service in accordance with an example embodiment.

FIG. 3 is a signaling diagram illustrating example operations for providing an MBS service in accordance with an example embodiment. In some example implementations, the operations shown in FIG. 3 may be performed between the gNB 120 and each of the UEs 110 shown in FIG. 1.

Referring to FIG. 3, at 210, the UEs 110 may report respective channel state information (CSI) to the gNB 120. For example, the gNB 120 may transmit channel state information reference signals (CSI-RSs) on multiple beams to the UEs 110, and the UEs 110 may periodically measure the CSI-RS signals received on the beams and send CSI feedback to the gNB 120. The UEs 110 may perform reference signal received power (RSRP) measurements based on the CSI-RS resources configured on the beams to determine the best beam that has the maximum RSRP measurement. In the example shown in FIG. 1, the UEs 110a, 110b, 110c and 110d may determine the beams B1, B2, B3 and B4 as the best beam, respectively. The CSI feedback generated at the respective UEs 110 may indicate the best beam by including a CSI-RS resource indicator (CRI) indicating the CSI-RS resource configured on the best beam. The CSI feedback may further include for example an SSB (SS/PBCH Block) resource indicator (SSBRI) indicating the SSB resource associated with the best beam, channel quality information (CQI), and beam strength information represented by e.g. L1-RSRP. In some embodiments, the CSI feedback may further include parameters such as a rank indicator (RI), a precoding matrix indicator (PMI) and/or a layer indicator (LI).

In some example embodiments, the UEs 110 may indicate up to N best beams in the CSI feedback where N is an integer more than one. The N best beams may each have a beam strength represented by e.g. L1-RSRP higher than a threshold. The CSI feedback may include the above-mentioned information/parameters relating to the N best beams, for example 2, 3 or more best beams depending on UE capability and/or network configuration. It would be appreciated that reporting more than one best beams would benefit the following operation 220 of determining beams for transmitting an MBS service to the UEs, which will be discussed in detail below.

With continuing reference to FIG. 3, at 220, the gNB 120 may determine one or more beams for transmitting an MBS service to the UEs 110, and a beam-specific repetition pattern for the respective one or more beams, based on the CSI reports received from the UEs 110. It would be appreciated that "beam-specific" herein means that the repetition pattern is determined for a specific beam. For example, a first repetition pattern is determined for a first beam, and a second repetition pattern is determined for a second beam.

The first repetition pattern for the first beam may be identical to or different from the second repetition pattern for the second beam.

The gNB 120 may run a radio resource allocation algorithm to determine the one or more beams and the beam-specific repetition pattern for transmitting the MBS service. The radio resource allocation algorithm may receive as input the CSI feedback e.g. the N best beams, L1-RSRP, CQI and/or the like received from the UEs 110, and output beams, time-domain repetitions on the respective beams, time and frequency resource allocation (hereinafter, "resource allocation" for short) for the repetitions and/or beams, and power allocation for the repetitions for transmitting the MBS service to the UEs 110. The radio resource allocation algorithm may aim to optimize the outputs so as to achieve some certain objectives, for example, to minimize resources used for the MBS service while ensuring coverage and reliability requirements of the service. The radio resource allocation algorithm may be implemented as an iterative process to consider fairness, UE mobility and time-varying channel conditions. For example, given an initial output value, the received power combined at a certain UE may be estimated according to the CSI feedback received from all the UEs. Then, the transmit power allocated to the beams and/or repetitions may be adjusted step by step so that the combined received power of all the UEs tends to be the same. In some embodiments, an artificial intelligence or deep learning algorithm may be used to optimize the output.

As discussed above, when the UEs 110 reports more than one best beam to the gNB 120, it would benefit the operation 220 of determining the beams for transmitting an MBS service to the UEs 110. For example, if a first UE reports a best beam A1 and a second UE reports a best beam B1 to the gNB 120, the gNB 120 has to use both beams A1 and B1 to deliver the MBS service to the first and second UEs. If the first UE reports two best beams A1, B1 and the second UE reports two best beams B1, C1 to the gNB 120, that is, the beam B1 acts as the second best beam for the first UE and as the first best beam for the second UE, then the gNB 120 may use the beam B1 to deliver the MBS service to both the first and second UEs. Of course, this is only an example, and the radio resource allocation algorithm may consider other factors such as continuous coverage and load balance to determine the beams and repetitions.

In some example embodiments, the MBS service may be a broadcast service, and the gNB 120 shall be able to deliver the broadcast service to all UEs served by the gNB 120. Then at the operation 220, the gNB 120 determines the beams, repetitions and resource allocation for the beams and/or repetitions based on the CSI feedback from all the UEs served by the gNB 120. In some example embodiments, the MBS service may be a multicast service, and the gNB 120 would deliver the multicast service to UEs which are interested in the multicast service. Then at the operation 220, the gNB 120 determines the beams, repetitions and resource allocation based on the CSI feedback from the UEs that are interested in the multicast service. Before the operation 220, the gNB 120 may inform all the UEs served by the gNB 120 of available multicast services by for example broadcasting a system information block (SIB) such as SystemInformationBlockType15 or by RRC signaling for example an RRC reconfiguration message. The SIB or RRC signaling may include a list of multicast services represented by for example a temporary mobile group identity (TMGI). If the UEs 110 are interested in one or more multicast services, the UEs 110 may send information of the multicast services of interest to the gNB 120 by for example RRC signaling such as an RRC reconfiguration complete message, or by an MBS interest indication message, or by a measurement report. Then the gNB 120 would add the UEs 110 into a multicast group relating to the multicast service and determine the beams, repetitions and resource allocation for transmitting the multicast service to the group of UEs at the operation 220.

Figure 4:
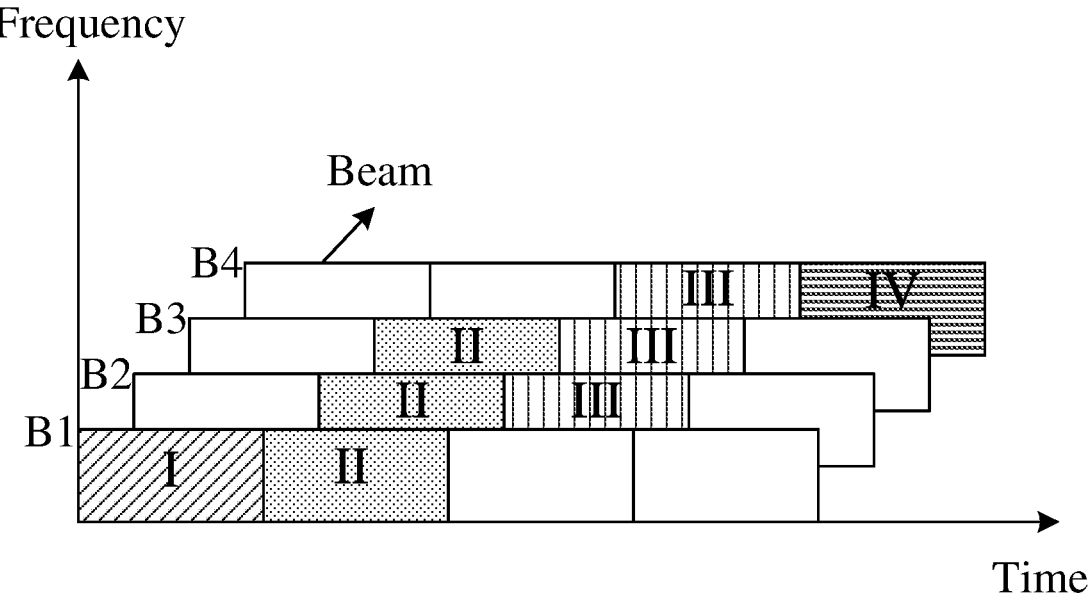
FIG. 4 is a schematic diagram illustrating a beam-specific repetition pattern for a plurality of beams in accordance with an example embodiment.

It should be noted that at the operation 220, the gNB 120 determines a beam-specific repetition pattern for the respective beams for transmitting the MBS service, of which an example is shown in FIG. 4. Referring to FIG. 4, the gNB 120 selects the beams B1-B4 to transmit the MBS service to the UEs 110. The beam B1 has a repetition pattern including repetitions I and II, the beams B2 and B3 has a repetition pattern including repetitions II and III, and the beam B4 has a repetition pattern including repetitions III and IV. The repetitions I-IV may carry the same traffic data for the MBS service, and one repetition may correspond to one slot in the time domain. It would be appreciated that the beams and repetitions may use identical or different time and/or frequency resources. If the beams B1-B4 and the repetitions I-IV use identical time and frequency resources, the repetitions II on the beams B1-B3 would combine over the air, and the repetitions III on the beams B2-B4 would combine over the air. If the beams B1-B4 and the repetitions I-IV use different time and/or frequency resources, the UEs 110 can receive the repetitions on the beams and then perform signal combining.

In the beam-specific repetition pattern determined at the operation 220, unnecessary repetitions may be omitted to reduce inter-beam interference and power waste. For example, referring to FIG. 4, the repetition I is omitted on the beams B2-B4, the repetition II is omitted on the beam B4, the repetition III is omitted on the beam B1 and the repetition IV is omitted on the beams B1-B3. As shown in the below Table 1, an interference area in percentage is calculated for the common repetition pattern shown in FIG. 2 and the beam-specific repetition pattern shown in FIG. 4. Assuming that a cell serving the UEs 110 has 16 beams and interference occurs between adjacent beams, the repetitions I-IV on the four beams B1-B4 shown in FIG. 2 have an interference area calculated as (4 beams+2 adjacent beams)/ (16 total beams)=37.5%. For the beam-specific repetition pattern shown in FIG. 4, the repetitions I, IV have an interference area calculated as (1 beam+2 adjacent beams)/ (16 total beams)=18.75%, and the repetitions II, III have an interference area calculated as (3 beams+2 adjacent beams)/ (16 total beams)=31.25%. Compared with the common repetition pattern shown in FIG. 2, the beam-specific repetition pattern shown in FIG. 4 significantly reduces the inter-beam interference.

TABLE 1

| | Inter-beam interference area | | | |
| --- | --- | --- | --- | --- |
| | Repetition I | Repetition II | Repetition III | Repetition IV |
| Common repetition pattern | 37.5% | 37.5% | 37.5% | 37.5% |
| Beam-specific repetition pattern | 18.75% | 31.25% | 31.25% | 18.75% |

At the operation 220, the gNB 120 may further determine flexible power allocation for the repetitions on the respective beams for transmitting the MBS service to the UEs 110. FIG.

Figure 5A:
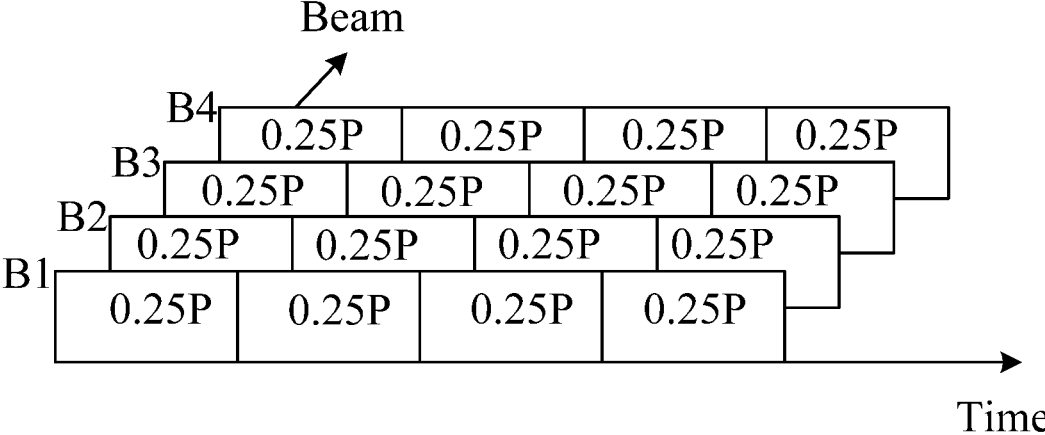
FIG. 5A is a schematic diagram illustrating average power allocation for a common repetition pattern on a plurality of beams.
Figure 5B:
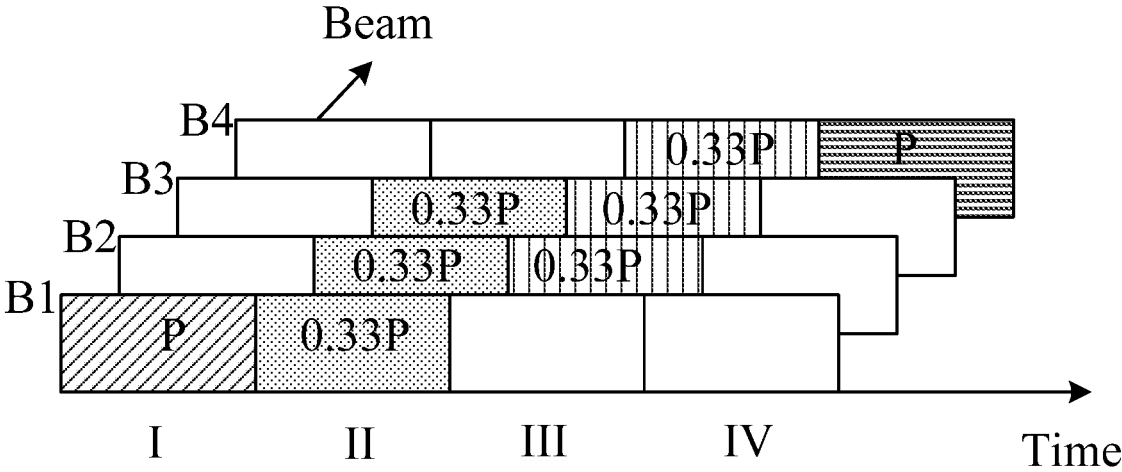
FIG. 5B is a schematic diagram illustrating an example of flexible power allocation for a beam-specific repetition pattern in accordance with an example embodiment.

5A shows average power allocation for the common repetition pattern shown in FIG. 2 where the power P is equally allocated to repetitions on the four beams. Assuming that the UEs can receive the best beam and the most adjacent beam, and the received power contributed by the most adjacent beam is about 3 dB less than the best beam, the received power at the UEs 110 is calculated and shown in the below Table 2. For the UE 110*a* having the best beam B1 and the UE 110*d* having the best beam B4, the received power is calculated as (1 P+½ P)*PL=1.5 P*PL where PL denotes path loss. For the UE 110*b* having the best beam B2 and the UE 110*c* having the best beam B3, the received power is calculated as (1 P+2/2 P)*PL=2P*PL. FIG. 5B shows an example flexible power allocation for the beam-specific repetition pattern shown in FIG. 4. Since some unnecessary repetitions are omitted in the beam-specific repetition pattern, power may be allocated to the repetitions in use. For example, the repetition I on the beam B1 and the repetition IV on the beam B4 may be allocated with power P, the repetitions II on the beams B1-B3 and the repetition III on the beams B2-B4 may be allocated with power P/3. The received power at the UEs 110*a*, 110*d* is calculated as (1.3 P+0.66/2 P)*PL=1.66 P*PL, and the received power at the UEs 110*b*, 110*c* is calculated as (0.66 P+1.33/2 P+0.66/2 P)*PL=1.66 P*PL. Compared with the average power allocation for the common repetition pattern shown in FIG. 5A, the flexible power allocation for the beam-specific repetition pattern shown in FIG. 5B can achieve equalized received power at the UEs.

TABLE 2

| | Received power at UEs | | | |
| --- | --- | --- | --- | --- |
| | UE 110a | UE 110b | UE 110c | UE 110d |
| Average power allocation | 1.5P*PL | 2P*PL | 2P*PL | 1.5P*PL |
| Flexible power allocation | 1.66P*PL | 1.66P*PL | 1.66P*PL | 1.66P*PL |

Figure 5C:
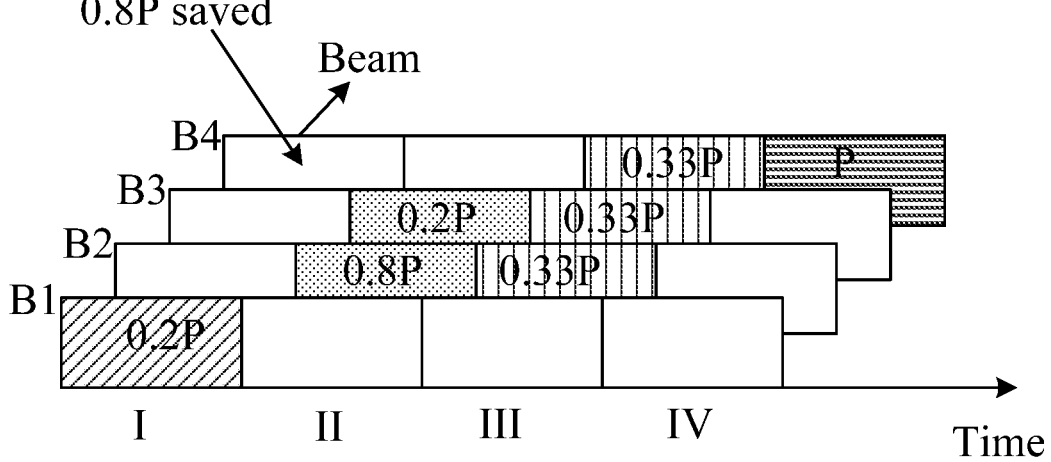
FIG. 5C is a schematic diagram illustrating an example of flexible power allocation for a beam-specific repetition pattern in accordance with another example embodiment.

FIG. 5C shows another example flexible power allocation for a beam-specific repetition pattern. The gNB 120 may determine the flexible power allocation for the repetitions at the operation 220 to minimize power consumption for the MBS service while meeting a predetermined reliability requirement of the service. For example, the gNB 120 is required to provide the MBS service with a reliability level higher than or equal to a threshold such as 99.999%. In the example shown in FIG. 5C, it is assumed that the UE 110*a* is positioned near the gNB 120, while the UEs 110*b*, 110*c* and 110*d* are positioned at the cell edge far away from the gNB 120. Referring to FIG. 5C, the beam B1, which is the best beam for the UE 110*a*, includes the repetition I and 0.2 P Tx power is allocated to the repetition I. The repetitions II, III and IV are not needed on the beam B1 because the repetition I having the power allocation 0.2 P is enough to achieve the reliability requirement. As such, 0.8 P Tx power may be saved, and the saved power may be used for e.g. PTP transmissions on other beams such as the beam B4. The system spectral efficiency may be improved by reusing the power, beams and/or resources.

Referring back to FIG. 3, at 230, the gNB 120 may inform the UEs 110 of the one or more beams and the beam-specific repetition pattern for the respective one or more beams determined at the operation 220. The UEs 110 each may receive information of all the beams determined at the operation 220, and the beam-specific repetition pattern for at least one of the beams that are available to the UE. The operation 230 may be performed in various ways, of which an example is shown in FIG. 6.

Figure 6:
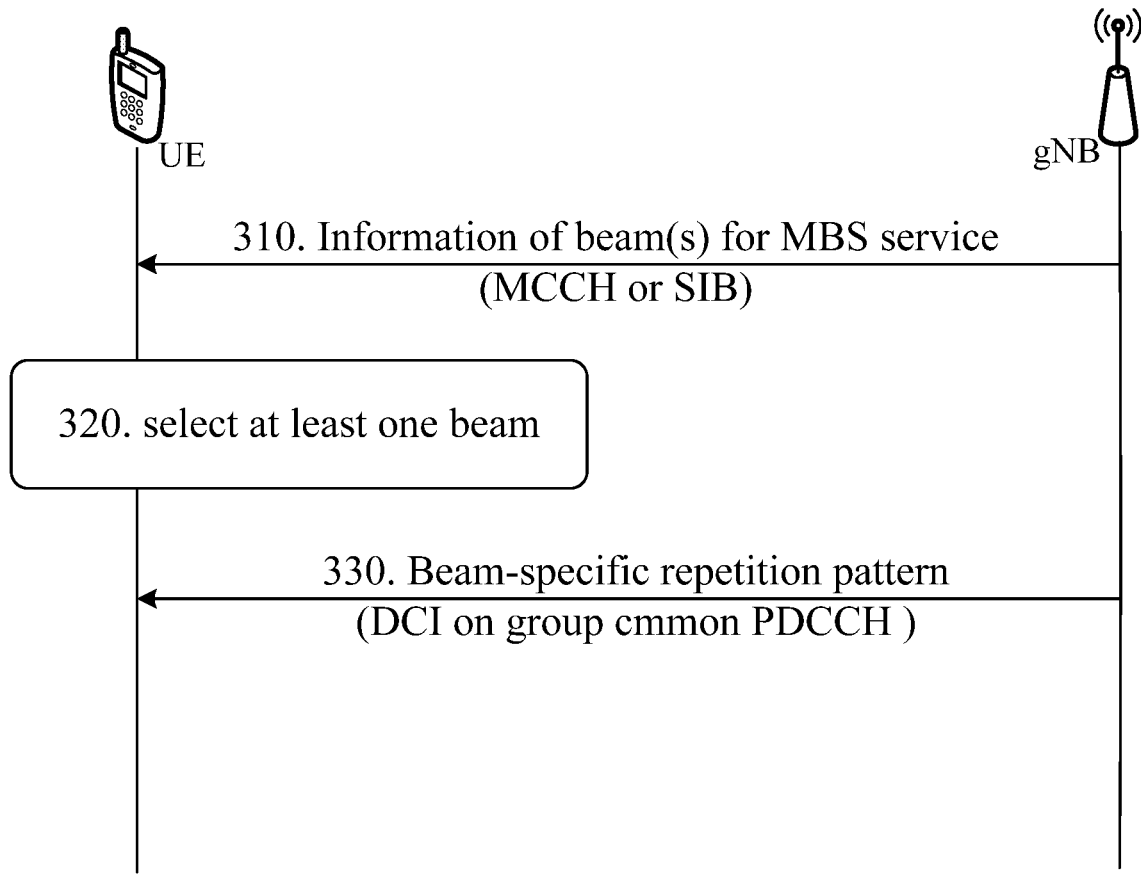
FIG. 6 is a signaling diagram illustrating example operations for transmitting information of beams and a beam-specific repetition pattern for the beams in accordance with an example embodiment.

Referring to FIG. 6, at 310, the gNB 120 may transmit information of the one or more beams for the MBS service to the UEs 110. The information of the one or more beams may be transmitted in a multicast broadcast system information block (SIB) or a multicast control channel (MCCH) message. For example, SystemInformationBlockType13 (SIB13) may carry control information for MBS services, including indication of beams for transmitting MBS services. The MCCH is a point-to-multipoint downlink channel used for transmitting MBS control information for example ongoing MBS sessions and corresponding radio resource configuration to UEs, and the MCCH may be mapped to a multicast channel (MCH) in a multicast broadcast single frequency network (MBSFN) scenario or to a downlink shared channel (DL-SCH) in a single cell-point to multipoint (SC-PTM) scenario. In the operation 310, the MCCH message may be used to notify the UEs 110 of the one or more beams on which the gNB 120 would transmit the MBS service. In some example embodiments, the SIB or the MCCH message may further include a parameter to indicate a total number of repetitions within a repetition pattern on the one or more beams for transmitting the MBS service. In the example shown in FIG. 4, the SIB or the MCCH message would include information of the beams B1, B2, B3 and B4 for the MBS service and indicate the total repetition number 4 within a repetition pattern for the beams B1-B4.

When the UEs 110 receive the SIB or the MCCH message, the UEs 110 would select from the one or more beams for the MBS service at least one beam available for the UE, at an operation 320. The UEs 110 may select the at least one beam based on beam measurement. For example, if a beam indicated in the SIB or the MCCH message has L1-RSRP higher than or equal to a threshold, the UE would consider the beam available and select the beam to receive the MBS service. If a beam indicated in the SIB or the MCCH message has L1-RSRP lower than the threshold, the UE would consider the beam unavailable and ignore the beam in subsequent operations. In some example embodiments, the UEs 110 may have performed RSRP measurements on the beams and reported the N best beams in the CSI feedback to the gNB 120 as discussed above in the operation 210 (FIG. 3), then at the operation 320 the UEs 110 may select beams that belong to the N best beams to receive the MBS service. Hereinafter, it is assumed that a UE can receive its best beam and the most adjacent beam(s) to the best beam. In the example shown in FIG. 1, the UE 110a may select the beams B1, B2 to receive the MBS service, the UE 110b may select the beams B1, B2, B3 to receive the MBS service, the UE 110c may select the beams B2, B3, B4 to receive the MBS service, and the UE 110d may select the beams B3, B4 to receive the MBS service.

Then at 330, the UEs 110 may receive the beam-specific repetition pattern on the at least one beam selected at the operation 320. At the operation 330, the gNB 120 may transmit the beam-specific repetition pattern on the corresponding beams. The beam-specific repetition pattern may be represented by a bitmap or bitmask which has a length in unit of bits equal to the total repetition number indicated in the SIB or the MCCH message. The below Table 3 shows an example of the beam-specific repetition pattern for the beams B1, B2, B3, B4 shown in FIG. 4. Referring to FIG. 4 and Table 3, the beam-specific repetition pattern may be represented by a bitmap "1100", "0110", "0110" and "0011" for the beams B1, B2, B3 and B4, respectively. The total number of repetitions is then implicitly indicated as 4. It would be appreciated that the "total number" herein refers to the length of the beam-specific repetition pattern in unit of repetition. For example, referring to the below Table 3 and FIG. 4, the beams B1-B4 each has a beam-specific repetition pattern including two valid repetitions, but the length of the beam-specific repetition pattern is four repetitions.

TABLE 3

| Example beam-specific repetition pattern on group common PDCCH | | | |
| --- | --- | --- | --- |
| Total Number of Repetitions - 4 | Repetition Pattern on Beam B1 | Repetition Pattern on Beam B2 | Repetition Pattern on Beam B3 | Repetition Pattern on Beam B4 |
| Repetition Bitmap | 1100 | 0110 | 0110 | 0011 |

In some example embodiments, the beam-specific repetition pattern may be transmitted on a group common physical downlink control channel (PDCCH). For example, the beam-specific repetition pattern may be included in downlink control information (DCI) transmitted on the group common PDCCH. The DCI may further include time and frequency resource allocation for the repetitions indicated in the beam-specific repetition pattern. In some example embodiments, the UEs 110 may receive and decode the DCI information transmitted in each slot to monitor the beam-specific repetition pattern. In some example embodiments, the UEs 110 does not need to monitor the beam-specific repetition pattern in each slot because the beam-specific repetition pattern does not change within duration of the beam-specific repetition pattern. When the UEs 110 receive the parameter indicating the total number of repetitions within the beam-specific repetition pattern at the operation 310, the UEs 110 knows that the beam-specific repetition pattern would not change during the total number of repetitions (i.e., slots). Then, the UEs 110 may monitor the DCI information periodically, and the monitoring period may correspond to the length of the beam-specific repetition pattern, i.e., the total number of repetitions. For example, the UEs 110 may monitor the DCI in a slot corresponding to the first repetition of the beam-specific repetition pattern. It would reduce DCI-receiving and decoding operations at the UEs 110.

Figure 7:
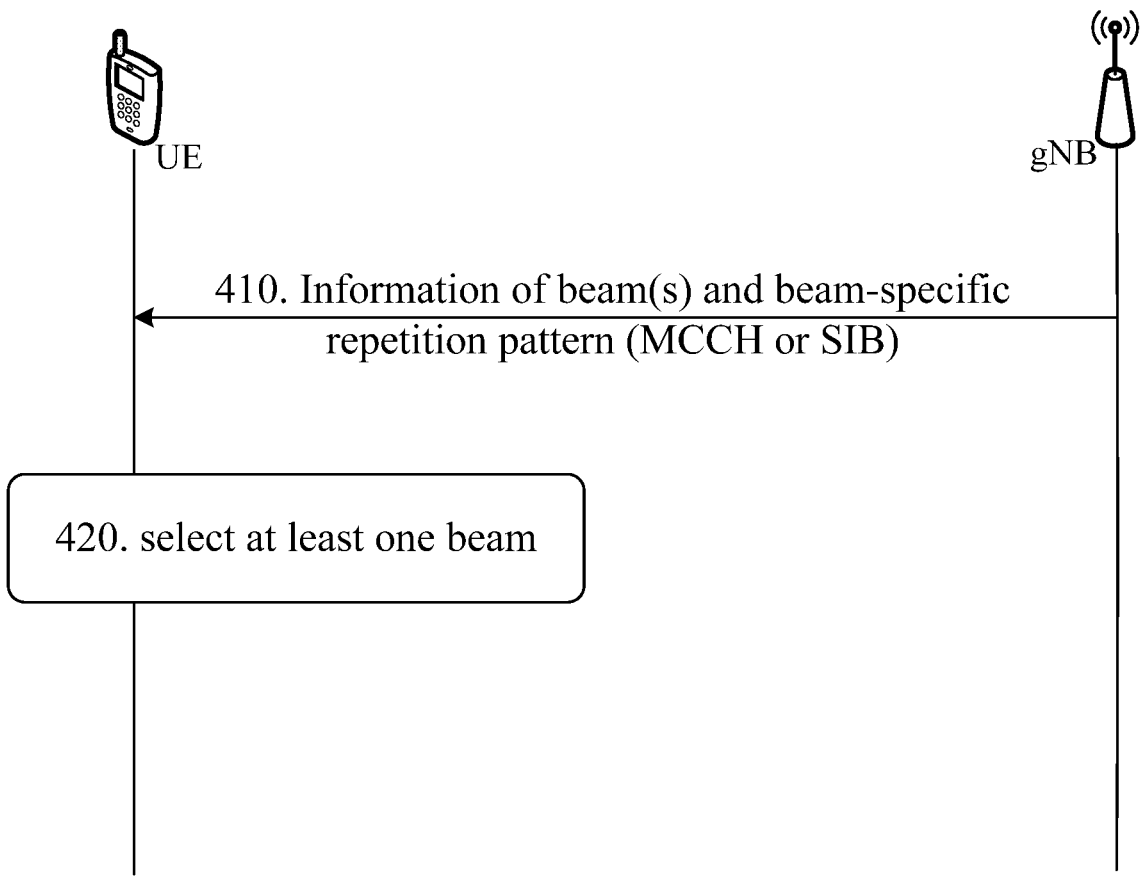
FIG. 7 is a signaling diagram illustrating example operations for transmitting information of beams and a beam-specific repetition pattern for the beams in accordance with another example embodiment.

FIG. 7 shows another example of transmitting the beam-specific repetition pattern determined at the gNB 120 to the UEs 110. In contrast to the procedure shown in FIG. 6 where each of the UEs 110 receives the beam-specific repetition pattern for the selected beams, in the procedure shown in FIG. 7, each of the UEs 110 may receive the beam-specific repetition pattern for all the beams for transmitting the MBS service.

Referring to FIG. 7, at 410, the UEs 110 may receive information of the one or more beams for the MBS service and the beam-specific repetition pattern for the one or more beams from the gNB 120. The gNB 120 may transmit the information of the one or more beams and the beam-specific repetition pattern in a multicast broadcast system information block (SIB) or a multicast control channel (MCCH) message. For example, SystemInformationBlockType13 (SIB13) may carry control information for MBS services, including indication of beams and beam-specific repetition patterns for transmitting MBS services. The MCCH is a point-to-multipoint downlink channel used for transmitting MBS control information for example ongoing MBS sessions and corresponding radio resource configuration to UEs, and it may be mapped to a multicast channel (MCH) in a multicast broadcast single frequency network (MBSFN) scenario or to a downlink shared channel (DL-SCH) in a single cell-point to multipoint (SC-PTM) scenario. In the example shown in FIG. 4, the SIB or the MCCH message may include information of the beams B1, B2, B3 and B4 for the MBS service and the beam-specific repetition pattern for the beams B1-B4. The beam-specific repetition pattern may be represented by a bitmap, as shown in the below Table 4. In some example embodiments, the SIB or the MCCH message may further include a parameter to indicate a total number of repetitions within the beam-specific repetition pattern for the beams. In some example embodiments, the parameter to indicate the total number of repetitions within the beam-specific repetition pattern may be omitted in the SIB and the MCCH message because the UEs 110 may derive the parameter from for example the information of the beams and the bitmap representing the beam-specific repetition pattern.

TABLE 4

Example beams and beam-specific repetition pattern on MCCH

| Beams | Beam-specific repetition pattern |
|---|---|
| Beam B1 | 1100 |
| Beam B2 | 0110 |
| Beam B3 | 0110 |
| Beam B4 | 0011 |

Although the UEs 110 each receives information of all the beams for the MBS service and the beam-specific repetition pattern for the beams, some beams may be unavailable to a certain UE. It is assumed that a certain UE can receive its best beam and the most adjacent beam(s) to the best beam. For example, referring to FIG. 1, the UE 110a can receive the beam B1 and B2, but it cannot receive the beam B3 and B4. Accordingly, at 420, the UEs 110 may select from the one or more beams at least one beam to receive the MBS service. The UEs 110 may select the at least one beam based on beam measurement. If a beam has L1-RSRP higher than or equal to a threshold, the UE would consider the beam available and select the beam to receive the MBS service. If a beam has L1-RSRP lower than the threshold, the UE would consider the beam unavailable and ignore the beam in subsequent operations. In some embodiments, the UEs 110 may have performed RSRP measurements on the beams and reported the N best beams in the CSI feedback to the gNB 120 as discussed above in the operation 210 (FIG. 3), then at the operation 420 the UEs 110 may select beams that belong to the N best beams to receive the MBS service. In the example shown in FIG. 1, the UE 110a may select the beams B1, B2 to receive the MBS service, the UE 110b may select the beams B1, B2, B3 to receive the MBS service, the UE 110c may select the beams B2, B3, B4 to receive the MBS service, and the UE 110d may select the beams B3, B4 to receive the MBS service.

Referring back to FIG. 3, at 240, the gNB 120 may transmit the MBS service using the beams and the beam-specific repetition pattern determined at the operation 220. For example, the gNB 120 may transmit the MBS service on the beams B1, B2, B3 and B4 using the beam-specific repetition pattern shown in FIG. 4. The MBS service may be transmitted on a multicast traffic channel (MTCH), which is a point-to-multipoint downlink channel for transmitting MBS traffic data from the network to UEs. The MTCH may be mapped to a multicast channel (MCH) in a multicast broadcast single frequency network (MBSFN) scenario or to a downlink shared channel (DL-SCH) in a single cell-point to multipoint (SC-PTM) scenario. At the operation 240, the UEs 110 may receive the MBS traffic data on the selected beams. For example, the UE 110a may receive the repetitions I, II on the beam B1 and the repetitions II, III on the beam B2 and combine signals extracted from the repetitions to decode the MBS traffic data. The UE 110b may receive the repetitions I, II on the beam B1, the repetitions II, III on the beam B2, and the repetitions II, III on the beam B3 and combine signals extracted from the repetitions to decode the MBS traffic data. The UEs 110c and 110d may receive and decode the MBS traffic data in a similar manner.

Figure 8:
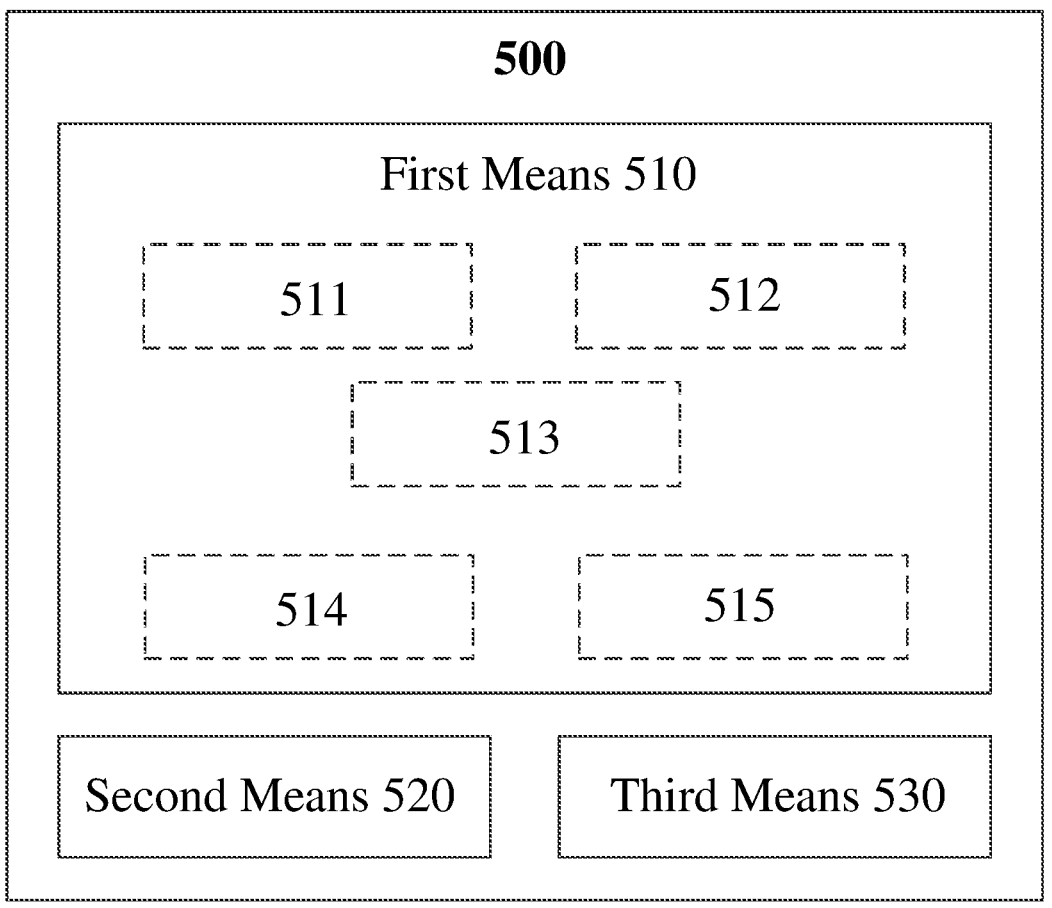
FIG. 8 is a functional block diagram illustrating an apparatus implemented at a terminal device in accordance with an example embodiment.

FIG. 8 is a functional block diagram illustrating an apparatus 500 according to an example embodiment. The apparatus 500 may be implemented at or as a part of a terminal device such as one of the UEs 110 discussed above. Referring to FIG. 8, the apparatus 500 may comprise a first means 510 for receiving information of one or more beams and a beam-specific repetition pattern for at least one of the one or more beams for transmission of a service such as an MBS service from a network device such as the gNB 120 discussed above. In some embodiments, the one or more beams and the beam-specific repetition pattern for at least one of the one or more beams may be different in the time and/or frequency domain.

In some example embodiments, the first means 510 may comprise a means 511 for receiving the information of one or more beams carried in a multicast broadcast system information block (SIB) or a multicast control channel (MCCH) message. The SIB or the MCCH message may optionally contain a parameter to specify a total number of repetitions on the one or more beams within the beam-specific repetition pattern. The first means 510 may further comprise a means 512 for selecting the at least one beam from the one or more beams based on beam measurement. For example, the means 512 may select beams which have L1-RSRP higher than or equal to a predetermined threshold. The first means 510 may further comprise a means 513 for receiving the beam-specific repetition pattern on the at least one beam selected from the one or more beams. In some example embodiments, the beam-specific repetition pattern may be received in a downlink control information (DCI) message on a group common physical downlink control channel (PDCCH), and the means 513 may monitor the DCI with a monitoring period corresponding to the total number of repetitions within the beam-specific repetition pattern.

In some example embodiments, the first means 510 may comprise a means 514 for receiving the information of one or more beams and the beam-specific repetition pattern of the respective one or more beams in a multicast broadcast system information block (SIB) or a multicast control channel (MCCH) message. In some example embodiments, the SIB or the MCCH message may further contain a parameter to indicate a total number of repetitions within the beam-specific repetition pattern. The first means 510 may further comprise a means 515 for selecting the at least one beam from the one or more beams determined at the means 514. The means 515 may select the at least one beam based on beam measurement. For example, the means 513 may select beams which have L1-RSRP higher than or equal to a predetermined threshold.

With continuing reference to FIG. 8, the apparatus 500 may further comprise a second means 520 for receiving the service on the at least one of the one or more beams based on the beam-specific repetition pattern. For example, the second means 520 may receive the repetitions on the selected at least one beam and perform signal combining on the repetitions if needed. In some example embodiment, the apparatus 500 may further comprise a third means 530 for transmitting channel state information (CSI) to the network device. The CSI may comprise information of N best beams for the terminal device and channel quality of the N best beams.

Figure 9:
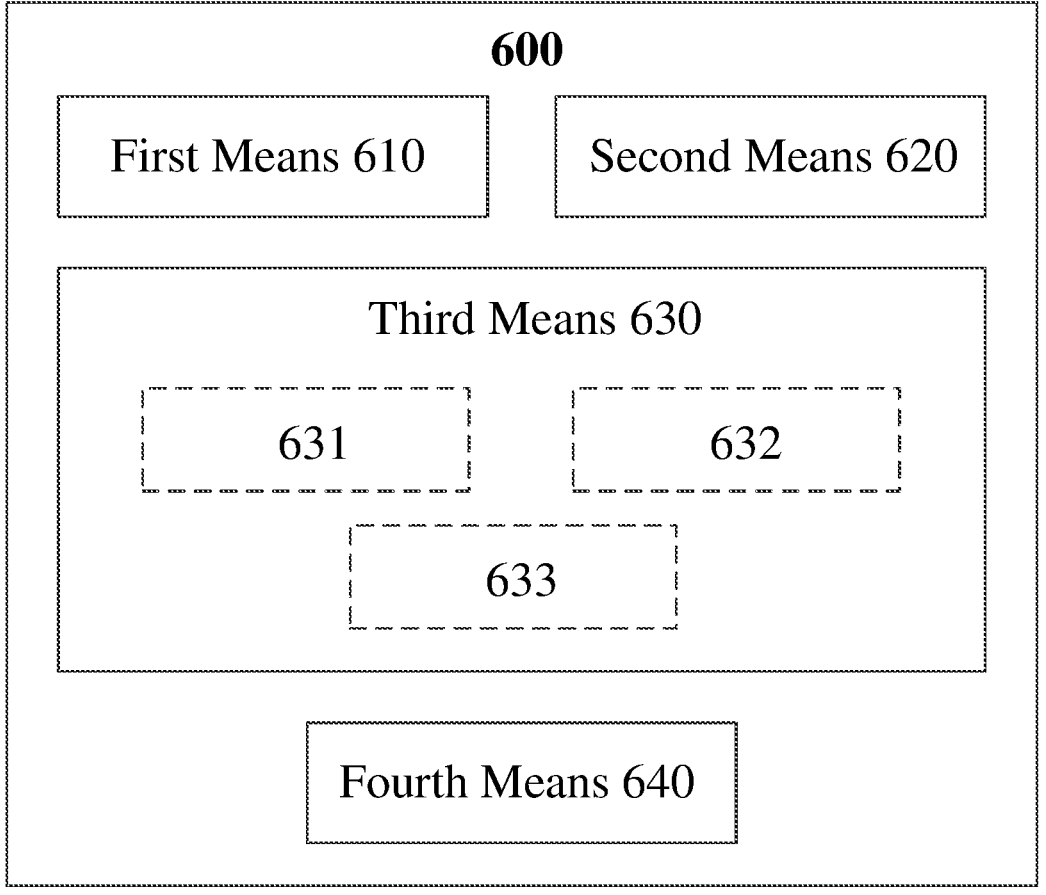
FIG. 9 is a functional block diagram illustrating an apparatus implemented at a network device in accordance with an example embodiment.

FIG. 9 is a functional block diagram illustrating an apparatus 600 according to an example embodiment. The apparatus 600 may be implemented at or as a part of a network device such as the gNB 120 discussed above. Referring to FIG. 9, the apparatus 600 may comprise a first means 610 for receiving channel state information (CSI) from one or more terminal devices. The CSI may comprise for example information of N best beams for the terminal device and channel quality of the N best beams. For example, the terminal device may perform beam measurement and report the N best beams which have L1-RSRP higher than or equal to a threshold.

The apparatus 600 may further comprise a second means 620 for determining one or more beams and a beam-specific repetition pattern for the respective one or more beams for transmission of a service such as an MBS service based on the CSI received from the one or more terminal devices. The one or more beams and a beam-specific repetition pattern for the respective one or more beams may be different in the time and/or frequency domain. In some embodiments, the second means 620 may also determine power allocation for the petitions of the one or more beams based on the CSI received from the one or more terminal devices. For example, the second means 620 may calculate the beam-specific repetition pattern and the power allocation based on the received CSI to meet a predetermined reliability threshold for the MBS service.

The apparatus 600 may further comprise a third means 630 for indicating the one or more beams and the beam-specific repetition pattern to the one or more terminal devices. In some example embodiments, the third means 630 may comprise a means 631 for transmitting information of the one or more beams in a multicast broadcast system information block (SIB) or a multicast control channel (MCCH) message, and a means 632 for transmitting the beam-specific repetition pattern on the respective one or more beams. The SIB or the MCCH message may further contain a parameter to specify a total number of repetitions on the one or more beams within the beam-specific repetition pattern. The beam-specific repetition pattern may be transmitted for example in a downlink control information (DCI) message on a group common physical downlink control channel (PDCCH). In some example embodiments, the third means 630 may comprise a means 633 for transmitting information of the one or more beams and the beam-specific repetition pattern of the respective one or more beams in a multicast broadcast system information block (SIB) or a multicast control channel (MCCH) message. In some example embodiments, the SIB or the MCCH message may further contain a parameter to specify a total number of repetitions on the one or more beams within the beam-specific repetition pattern.

The apparatus 600 may further comprise a fourth means 640 for transmitting the service on the one or more beams using the beam-specific repetition pattern.

Figure 10:
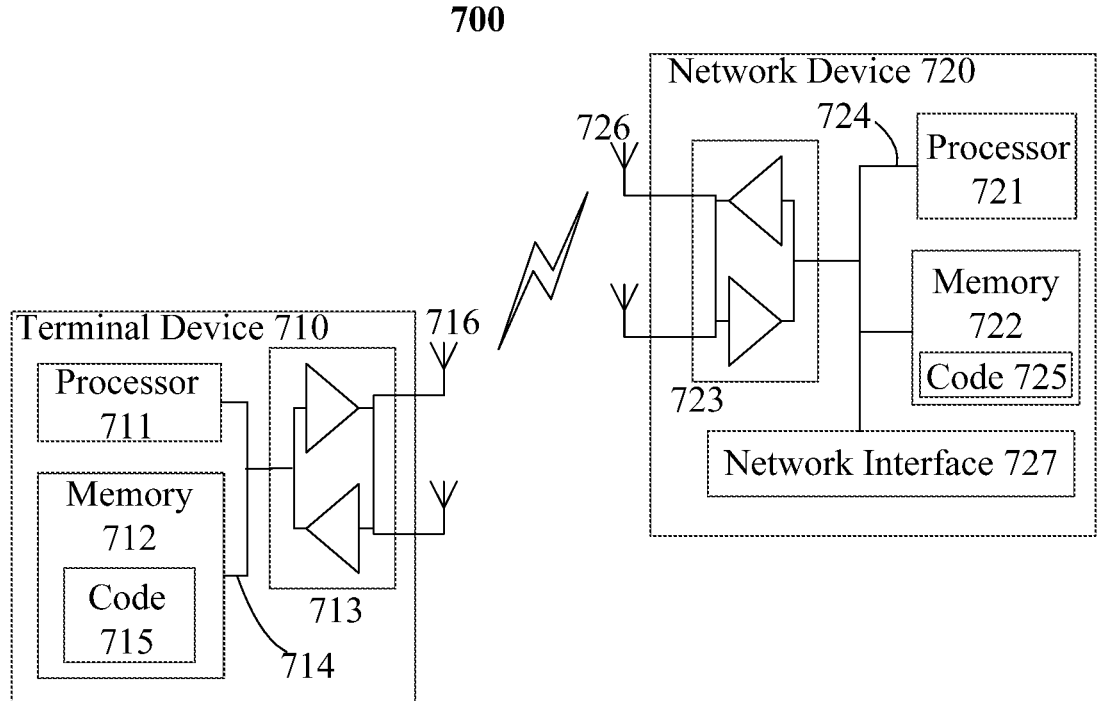
FIG. 10 is a structural block diagram illustrating an example communication system in which example embodiments of the present disclosure may be implemented.

FIG. 10 is a block diagram illustrating an example communication system 700 in which aspects of the present disclosure may be performed. As shown in FIG. 10, the communication system 700 may include a terminal device 710 which may be implemented as one of the UEs 110 discussed above, and a network device 720 which may be implemented as the base station such as gNB 120 discussed above. Although FIG. 10 shows only one terminal device 710, it would be appreciated that the communication system 700 may comprise a plurality of terminal devices 710 that wirelessly connect to the network device 720.

Referring to FIG. 10, the terminal device 710 may comprise one or more processors 711, one or more memories 712 and one or more transceivers 713 interconnected through one or more buses 714. The one or more buses 714 may be address, data, or control buses, and may include any interconnection mechanism such as series of lines on a motherboard or integrated circuit, fiber, optics or other optical communication equipment, and the like. Each of the one or more transceivers 713 may comprise a receiver and a transmitter, which are connected to one or more antenna elements 716. The terminal device 710 may wirelessly communicate with the network device 720 through the one or more antenna elements 716. The one or more memories 712 may include computer program code 715. The one or more memories 712 and the computer program code 715 may be configured to, when executed by the one or more processors 711, cause the terminal device 710 to perform processes and steps relating to the UEs 110 as described above.

The network device 720 may comprise one or more processors 721, one or more memories 722, one or more transceivers 723 and one or more network interfaces 727 interconnected through one or more buses 724. The one or more buses 724 may be address, data, or control buses, and may include any interconnection mechanism such as a series of lines on a motherboard or integrated circuit, fiber, optics or other optical communication equipment, and the like. Each of the one or more transceivers 723 may comprise a receiver and a transmitter, which are connected to a number of antenna elements 726. The network device 720, which may operate as a base station for the terminal device 710, may wirelessly communicate with the terminal device 710 through the antenna elements 726 and support MIMO technologies including for example beam-forming. The one or more network interfaces 727 may provide wired or wireless communication links through which the network device 720 may communicate with other network devices, entities or functions. The one or more memories 722 may include computer program code 725. The one or more memories 722 and the computer program code 725 may be configured to, when executed by the one or more processors 721, cause the network device 720 to perform processes and steps relating to the gNB 120 as described above.

The one or more processors 711, 721 discussed above may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 711, 721 may be configured to control other elements of the terminal/network device and operate in cooperation with them to implement the procedures discussed above.

The one or more memories 712, 722 may include at least one storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 712, 722 may include but not limited to an electric, a magnetic, an optical, an electromagnetic, an infrared, or a semiconductor system, apparatus, or device or any combination of the above.

The network device 720 can be implemented as a single network node, or disaggregated/distributed over two or more network nodes, such as a central unit (CU), a distributed unit (DU), a remote radio head-end (RRH), using different functional-split architectures and different interfaces.

It would be understood that blocks in the drawings may be implemented in various manners, including software, hardware, firmware, or any combination thereof. In some example embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some example embodiments further provide computer program code or instructions which, when executed by one or more processors, may cause a device or apparatus to perform the procedures described above. The computer program code for carrying out procedures of the example embodiments may be written in any combination of one or more programming languages. The computer program code may be provided to one or more processors or controllers of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

Some example embodiments further provide a computer program product or a computer readable medium having the computer program code or instructions stored therein. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single example embodiment. Conversely, various features that are described in the context of a single example embodiment may also be implemented in multiple example embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

Abbreviations used in the description and/or in the figures are defined as follows:

| AI | Artificial Intelligence |
|---|---|
| BS | Base Station |
| gNB | next Generation Node-B |
| MBMS | Multimedia Broadcast Multicast Service |
| MBS | Multicast Broadcast Service |
| MBSFN | Multicast Broadcast Single Frequency Network |
| MCCH | Multicast Control Channel |
| MTCH | Multicast Traffic Channel |
| NR | New Radio |
| PDCCH | Physical Downlink Control Channel |
| PTM | Point-to-Multipoint |
| PTP | Point-to-Point |
| RRC | Radio Resource Control |
| RSRP | Reference Signal Received Power |
| SC-PTM | Single Cell Point-to-Multipoint |
| SIB | System Information Block |
| SSB | Synchronization Signal and PBCH Block |
| TMGI | Temporary Mobile Group Identity |
| UE | User Equipment |

What is claimed is:

1. A terminal device comprising:
at least one processor; and
at least one memory including computer program code, the at least one memory and the computer program code configured to, with the at least one processor, cause the terminal device to: receive information of one or more beams and a beam-specific repetition pattern for at least one of the one or more beams for transmission of a service from a network device; and
    receive the service on the at least one of the one or more beams based on the beam-specific repetition pattern;
        wherein receiving information of one or more beams and a beam-specific repetition pattern for at least one of the one or more beams comprises:
    receiving the information of one or more beams carried in a multicast broadcast system information block or a multicast control channel message; and receiving the beam-specific repetition pattern on the at least one of the one or more beams; and
    wherein the beam-specific repetition pattern is received in a downlink control information message on a group common physical downlink control channel.

2. The terminal device of claim 1 wherein receiving information of one or more beams and a beam-specific repetition pattern for at least one of the one or more beams further comprises:

selecting the at least one beam from the one or more beams based on beam measurement.

3. The terminal device of claim 1 wherein the multicast broadcast system information block or the multicast control channel message further comprises a parameter to specify a total number of repetitions on the one or more beams within the beam-specific repetition pattern.

4. The terminal device of claim 3 wherein the terminal device monitors the downlink control information with a monitoring period corresponding to the total number of repetitions within the beam-specific repetition pattern.

5. The terminal device of claim 1 wherein receiving information of one or more beams and a beam-specific repetition pattern for at least one of the one or more beams comprises:

receiving the information of one or more beams and the beam-specific repetition pattern of the respective one or more beams in a multicast broadcast system information block or a multicast control channel message.

6. The terminal device of claim 5 wherein the at least one memory and the computer program code are further configured to, with the at least one processor, cause the terminal device to:

select the at least one beam from the one or more beams based on beam measurement, before receiving the service.

7. A network device comprising:

at least one processor; and at least one memory including computer program code, the at least one memory and the computer program code configured to, with the at least one processor, cause the network device to:

receive channel state information from one or more terminal devices; determine, based on the channel state information, one or more beams and a beam-specific repetition pattern for the respective one or more beams for transmission of a service to the one or more terminal devices;

indicate the one or more beams and the beam-specific repetition pattern to the one or more terminal devices; and transmit the service on the one or more beams using the beam-specific repetition pattern;

wherein indicating the one or more beams and the beam-specific repetition pattern to the one or more terminal devices comprises:

transmitting information of the one or more beams in a multicast broadcast system information block or a multicast control channel message; and transmitting the beam-specific repetition pattern on the respective one or more beams; and wherein the beam-specific repetition pattern is transmitted in a downlink control information message on a group common physical downlink control channel.

8. The network device of claim 7 wherein determining one or more beams and a beam-specific repetition pattern comprises determining power allocation for the respective repetitions of the one or more beams based on the channel state information received from the one or more terminal devices.

9. The network device of claim 8 wherein the beam-specific repetition pattern and the power allocation for the respective repetitions are calculated using the channel state information to meet a predetermined reliability threshold.

10. The network device of claim 7 wherein the multicast broadcast system information block or multicast control channel message further comprises a parameter to specify a total number of repetitions on the one or more beams within the beam-specific repetition pattern.

11. A method implemented at a terminal device comprising:

receiving information of one or more beams and a beam-specific repetition pattern for at least one of the one or more beams for transmission of a service from a network device; and receiving the service on the at least one of the one or more beams based on the beam-specific repetition pattern;

wherein receiving information of one or more beams and a beam-specific repetition pattern for at least one of the one or more beams comprises:

receiving the information of one or more beams carried in a multicast broadcast system information block or a multicast control channel message; and receiving the beam-specific repetition pattern on the at least one of the one or more beams; and wherein the beam-specific repetition pattern is received in a downlink control information message on a group common physical downlink control channel.

12. The method of claim 11 wherein receiving information of one or more beams and a beam-specific repetition pattern for at least one of the one or more beams further comprises:

selecting the at least one beam from the one or more beams based on beam measurement.

13. The method of claim 11 wherein the multicast broadcast system information block or the multicast control channel message further comprises a parameter to specify a total number of repetitions on the one or more beams within the beam-specific repetition pattern.

14. The method of claim 13 wherein the terminal device receives the downlink control information periodically, and the receiving period corresponds to the total number of repetitions within the beam-specific repetition pattern.

15. The method of claim 11 wherein receiving information of one or more beams and a beam-specific repetition pattern for at least one of the one or more beams comprises: receiving the information of one or more beams and the beam-specific repetition pattern of the respective one or more beams in a multicast broadcast system information block or a multicast control channel message.

* * * * *